US008164512B2

(12) United States Patent
Venkatachalam et al.

(10) Patent No.: US 8,164,512 B2
(45) Date of Patent: Apr. 24, 2012

(54) GAUSSIAN MODEL ADAPTIVE PROCESSING IN THE TIME DOMAIN

(75) Inventors: Chandrasekaran Venkatachalam, Fort Collins, CO (US); Cuong M. Nguyen, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 40 days.

(21) Appl. No.: 12/575,698

(22) Filed: Oct. 8, 2009

(65) Prior Publication Data
US 2010/0090884 A1 Apr. 15, 2010

Related U.S. Application Data

(60) Provisional application No. 61/103,958, filed on Oct. 9, 2008.

(51) Int. Cl.
*G01S 13/00* (2006.01)
(52) U.S. Cl. .................................... 342/159; 342/162
(58) Field of Classification Search .............. 342/160, 342/162
See application file for complete search history.

(56) References Cited

U.S. PATENT DOCUMENTS

| | | | | |
|---|---|---|---|---|
| 3,918,054 | A * | 11/1975 | Collins | 342/192 |
| 5,999,119 | A * | 12/1999 | Carnes et al. | 342/135 |
| 7,589,666 | B2 | 9/2009 | Passarelli, Jr. et al. | |
| 2008/0001808 | A1 | 1/2008 | Passarelli, Jr. et al. | |

FOREIGN PATENT DOCUMENTS
WO  WO 2009/045618 A2  4/2009

OTHER PUBLICATIONS

Nguyen, Cuong M., Dmitri N. Moisseev, V. Chandrasekar, 2008: A Parametric Time Domain Method for Spectral Moment Estimation and Clutter Mitigation for Weather Radars. J. Atmos. Oceanic Technol., 25, 83-92.*
Nguyen, C.M.; Chandrasekar, V.; Moisseev, D.N.; Gaussian model adaptive time domain filter (GMAT) for weather radars, Jul. 2008; Geoscience and Remote Sensing Symposium, 2008. IGARSS 2008. IEEE International , vol. 2 pp. II-509-II-512.*
Sachidananda, M; Ground Clutter Filtering Dual-Polarized, Staggered PRT Sequences; Journal of atmospheric and oceanic technology; Aug. 2006; vol. 23, pp. 1114-1130.*
International Application No. PCT/US2009/060055, International Search Report and Written Opinion, 12 pages, Mar. 2, 2010.
Nguyen, Cuong M. et al., "A Parametric Time Domain Method for Spectral Moment Estimation and Clutter Mitigation for Weather Radars," American Meteorological Society, pp. 83-92, Jan. 2008.
Nguyen, Cuong M. et al., "Gaussian Model Adaptive Time Domain Filter (GMAT) for Weather Radars," Abstracts for IGARSS, 2 pages, 2008.
Siggia, A. D. et al., "Gaussian Model Adaptive Processing (GMAP) for Improved Ground Clutter Cancellation and Moment Calculation," Proceedings of ERAD, pp. 67-73, 2004.

* cited by examiner

*Primary Examiner* — Timothy A Brainard
(74) *Attorney, Agent, or Firm* — Kilpatrick Townsend & Stockton LLP

(57) ABSTRACT

Embodiments of the present invention provide a Gaussian adaptive filter for ground clutter filtering and signal parameter estimation for weather radars in the time domain. In some embodiments, the filtering can be applied to dual polarization radar systems. In some embodiments, the clutter component of the signal can be transformed to noise. An interpolation procedure can then be used to recover the transformed part of the weather. A unique filter can be designed to use for both H and V channels for dual-polarization parameter estimation. In addition, the filter can be directly extended for staggered PRT 2/3 sampling scheme.

21 Claims, 16 Drawing Sheets

GAUSSIAN MODEL ADAPTIVE PROCESSING IN THE TIME DOMAIN

CROSS-REFERENCE TO RELATED APPLICATIONS

This application is a non-provisional of, and claims the benefit of, U.S. Provisional Patent Application Ser. No. 61/103,958, entitled "Gaussian Model Adaptive Processing-Time Domain (GMAP-TD)," filed Oct. 9, 2008, the entire disclosure of which is incorporated herein by reference for all purposes.

BACKGROUND

One of the fundamental objectives of meteorological radar systems is to sample the atmosphere surrounding the Earth to provide a quantitative measure of precipitation. Conventional meteorological radars provide coverage over long ranges, often on the order of hundreds of kilometers. A general schematic of how such conventional radar systems function is provided in FIG. 1. In this illustration, a radar is disposed at the peak of a raised geographical feature such as a hill or mountain 104. The radar generates an electromagnetic beam 108 that disperses approximately linearly with distance, with the drawing showing how the width of the beam 108 thus increases with distance from the radar. Various examples of weather patterns 116 that might exist and which the system 100 attempts to sample are shown in different positions above the surface 112 of the Earth.

For weather radars, the signal coming from ground targets represents clutter. It is generally desirable to mitigate the contribution of clutter to the overall radar signal to improve the quality of the radar signal and for quantitative applications. Such mitigation is conventionally achieved by applying a notch filter around zero Doppler frequency. The main disadvantage of such an approach is the signal loss, especially in cases where weather echoes have small radial velocities. Recent developments in radar signal processors allow for improvement in clutter suppression. For example, one approach compensates for the effect of notching by using advanced spectral filter that interpolates over notched spectral lines. The limitation of spectral filtering techniques is the effect of spectral leakage, caused by finite sample length, on the spectral moments estimates. As a result, spectral processing limits successful clutter suppression to cases of moderate clutter-to-signal ratios. Another approach can use a Gaussian weather model in the frequency domain to remove ground clutter over a variable number of spectral components as described in U.S. patent application Ser. No. 11/322,524.

BRIEF SUMMARY

Embodiments of the present invention apply various mathematical functions to mitigate clutter within a radar signal. Various embodiments mitigate clutter in the time domain, use a Gaussian model, mitigate clutter in a radar signal sampled with either a uniform or staggered sampling technique (e.g., a staggered 2/3 sampling technique), and/or use unique filter matrix.

In some embodiments, a radar signal is propogated into a region of interest using a radar transmitter and sampled time-domain radar data scattered within the region of interest is sampled. Ground clutter in the radar data can be mitigated using a Gaussian model in the time domain. For example, clutter mitigation can include determining an auto-covariance filter output matrix $R_y$ using an estimated filter matrix A with the radar data; calculating spectral parameters from the auto-covariance filter output matrix; determining a precipitation covariance matrix $R_p$ using the spectral parameters; and/or iteratively estimating the next auto-covariance filter output matrix using $R_{y,n+1}=R_{y,n}+R_{p,n}-AR_{p,n}A^H$ until the difference between two consecutive spectral parameters is less than a threshold value. In some embodiments, the radar data can include dual polarization radar data.

In some embodiments, a Gaussian model can be used to estimate a precipitation auto-covariance matrix as. Accordingly, this Gaussian model can provide:

$$R_p[k,l] = P_p \exp\left(-\frac{8\pi^2 \sigma_p^2 (k-1)^2 T_s^2}{\lambda^2}\right) \exp\left(-j\frac{4\pi \bar{v}(k-1)T_s}{\lambda}\right).$$

In some embodiments, a filtering matrix can be used to create a filtered output matrix such that: $A=(R_c/\sigma_N^2+I_m)^{-1/2}$, where $R_c$ is the clutter covariance matrix and $\sigma_N^2$ is the noise power. In some embodiments, $R_c$ and $\sigma_N^2$ are estimated. In some embodiments, an auto-covariance matrix of the filter output can be computed using $R_y=AR_x$, where $R_x$ represents the auto-covariance matrix of the input data. From the auto-covariance matrix of the filter output spectral moments for precipitation echo ($\bar{P}_p, \bar{v}, \sigma_p$) can be estimated and a precipitation auto-covariance matrix $R_p$ can be calculated from these signal spectral moments. In some embodiments, the next filter output using $R_{y,n+1}=R_{y,n}+R_{p,n}-AR_{p,n}A^H$ and the signal spectral moments from $R_y$ and $R_{y+1}$ can be calculated until the power difference between two consequence iterations is less than a predetermined threshold.

In some embodiments, a radar system is provided that can include a transmitter, a receiver and a computer system. The transmitter can be configured to transmit a radar signal into a region of interest and the receiver can be configured to receive a data signal scattered from the region of interest. The computer system can be coupled at least with the receiver, and can be configured to filter clutter from the data signal using a Gaussian model in the time domain. In some embodiments, the computer system can filter data in real-time.

In some embodiments, a method for filtering clutter from a radar signal can include applying a filter matrix to an auto-covariance matrix of the radar signal producing a first filter output matrix; estimating a precipitation auto-covariance matrix using the filter output and the filter matrix; and calculating a second filter output matrix. The second filter output matrix, in some embodiments, can equal the output matrix plus the difference between the precipitation auto-covariance matrix and a filtered precipitation auto-covariance matrix. In some embodiments, the precipitation auto-covariance matrix can be estimated using signal parameters from the first filter output matrix.

DETAILED DESCRIPTION

In some embodiments, a Gaussian Model Adaptive Processing-Time Domain system (GMAP-TD) for clutter mitigation and spectral moment estimation that operates in the time domain is provided. In some embodiments, GMAP-TD can operate with a dual-polarized weather radar system. In some embodiments, GMAP-TD operates completely in time domain. In some embodiments, GMAP-TD can overcome disadvantages of spectral processing methods In some embodiments, GMAP-TD can be applied with staggered PRT techniques used for range-velocity ambiguity mitigation. Above all the computational requirement of GMAP-TD is such that it can be implemented for real time application using general purpose processors and in the time domain.

Figure 1:
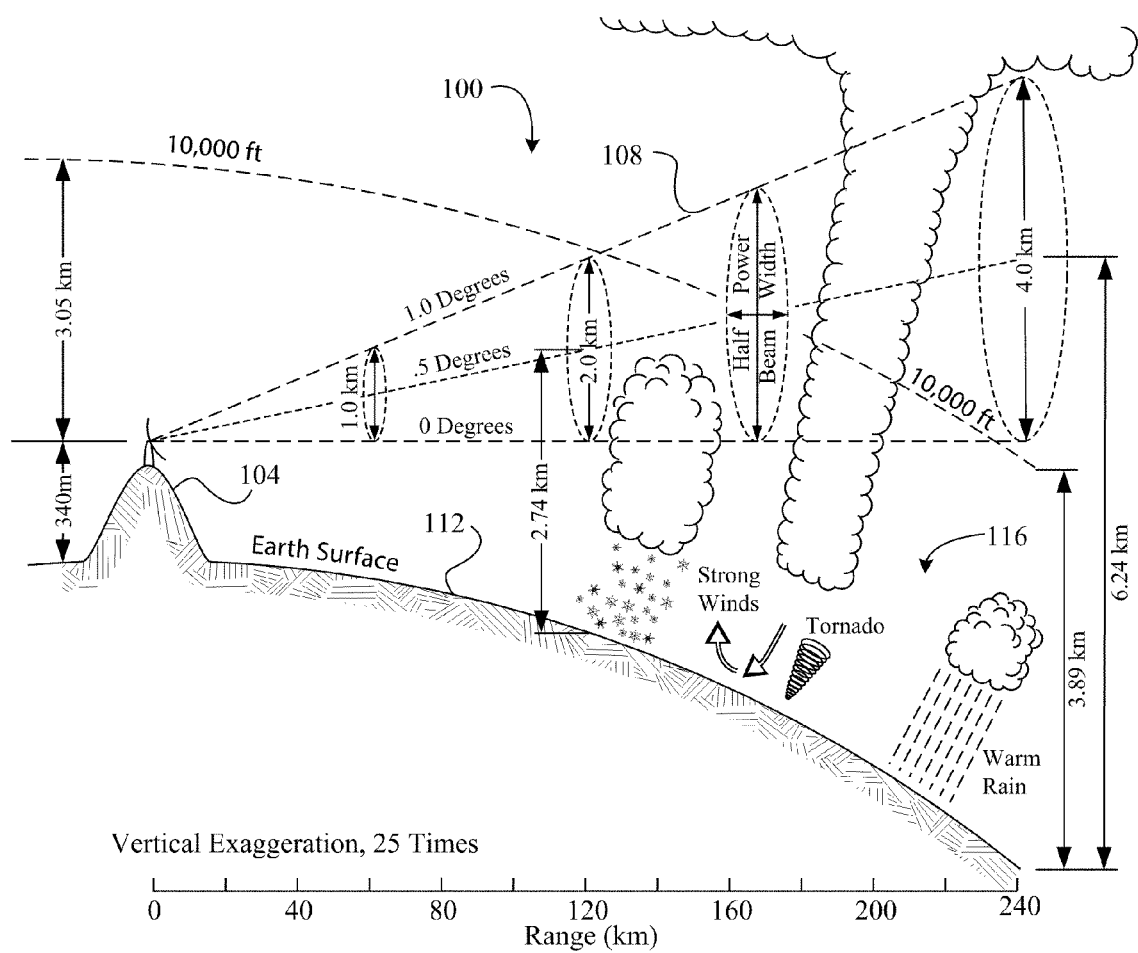
FIG. 1 provides a schematic illustration of the operation of a conventional radar system (reproduced from the National Academy of Sciences Report, "Flash flood forecasting over complex terrain").
Figure 2:
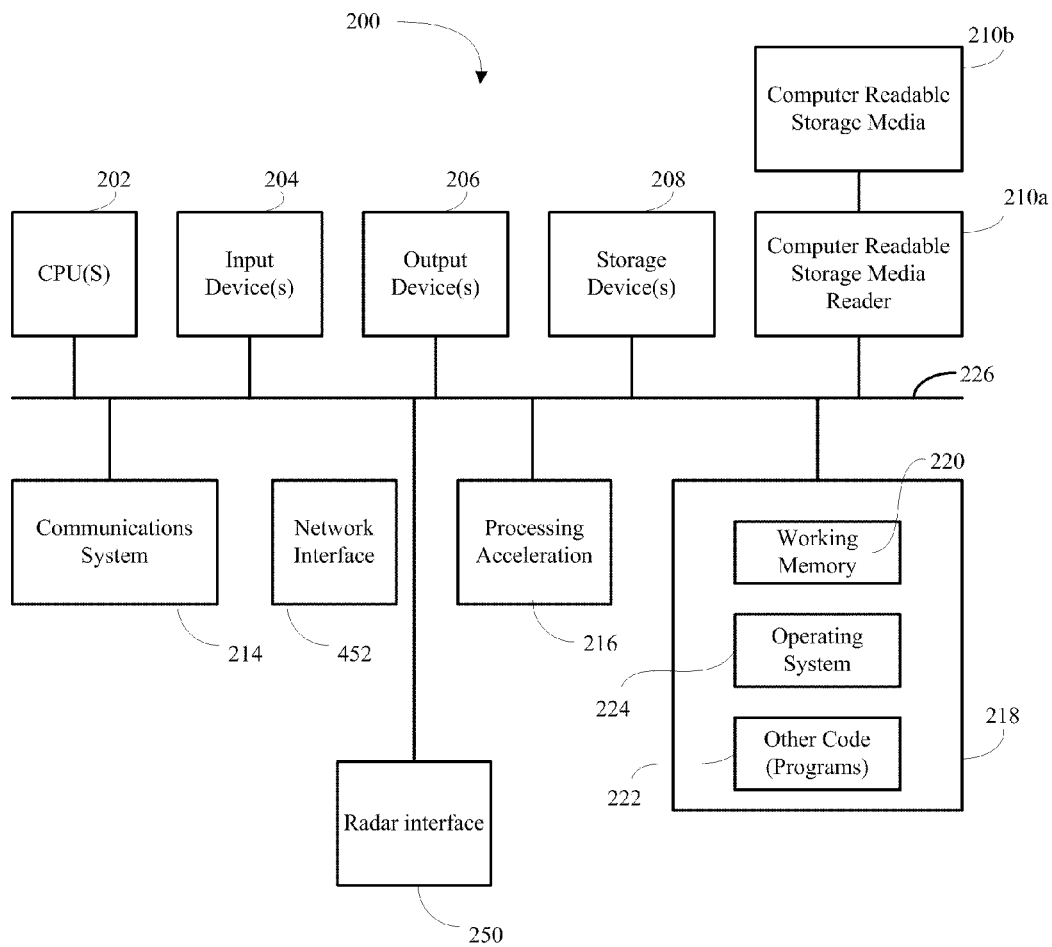
FIG. 2 shows a simplified block diagram of a computational system that can be used to implement embodiments of the invention.

FIG. 2 shows a simplified block diagram of a computer system 200 that can be coupled with a single or dual polarization radar system for computation of environmental parameters using various embodiments of the invention. Computer system 200 can be used to perform any or all the computations shown in FIG. 3 and/or FIG. 4. The drawing illustrates how individual system elements can be implemented in a separated or more integrated manner. The computer 200 is shown having hardware elements that are electrically coupled via bus 226. Network interface 252 can communicatively couple the computational device 200 with another computer, for example, through a network such as the Internet. The hardware elements can include a processor 202, an input device 204, an output device 206, a storage device 208. a computer-readable storage media reader 210a, a communications system 214, a processing acceleration unit 216 such as a DSP or special-purpose processor, and memory 218. The computer-readable storage media reader 210a can be further connected to a computer-readable storage medium 210b, the combination comprehensively representing remote, local, fixed, and/or removable storage devices plus storage media for temporarily and/or more permanently containing computer-readable information.

Radar interface 250 is coupled with bus 226. In some embodiments, radar interface 250 can be any type of communication interface. For example, radar interface 250 can be a USB interface, UART interface, serial interface, parallel interface, etc. Radar interface 250 can be configured to couple directly with any type of radar system such as a dual polarization radar system.

The computer system 200 also comprises software elements, shown as being currently located within working memory 220, including an operating system 224 and other code 222, such as a program designed to implement methods and/or processes described herein. In some embodiments, other code 222 can include software that provides instructions for receiving user input a dual polarization radar system and manipulating the data according to various embodiments disclosed herein. In some embodiments, other code 222 can include software that can predict or forecast weather events, and/or provide real time weather reporting and/or warnings. It will be apparent to those skilled in the art that substantial variations can be used in accordance with specific requirements. For example, customized hardware might also be used and/or particular elements might be implemented in hardware, software (including portable software, such as applets), or both. Further, connection to other computing devices such as network input/output devices can be employed.

Figure 3:
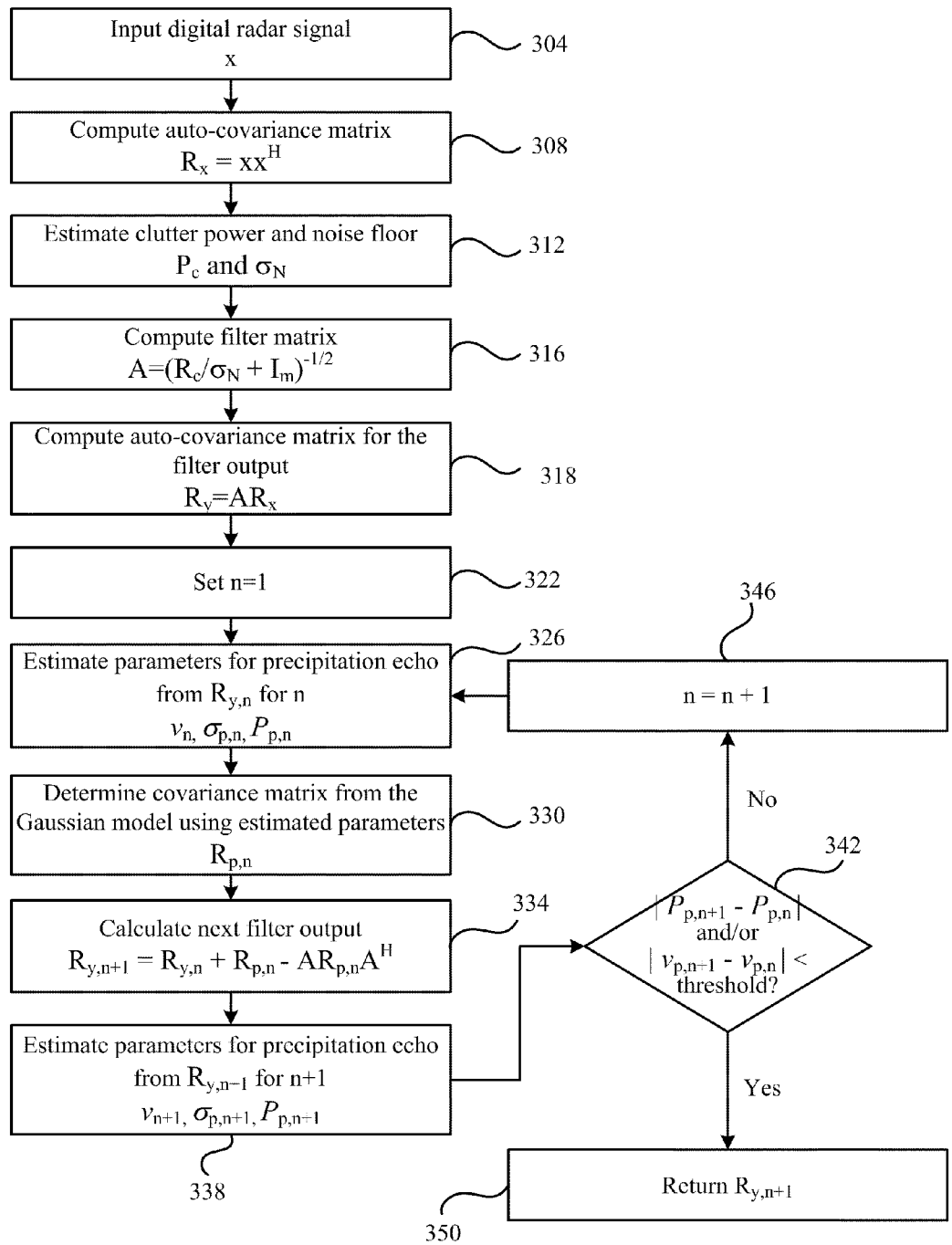
FIG. 3 shows a flowchart of a process for enhancing radar data according to some embodiments.

FIG. 3 shows flowchart 300 of a process for enhancing radar data using a Gaussian model in the time domain according to some embodiments. This embodiment, for example, can be used to filter ground clutter from a radar signal. An input radar signal x is received at block 304. The radar signal can be received from memory, a storage location, and/or a radar device (e.g., through radar interface 250). In some embodiments, the input radar signal can be received and processed in real time. At block 308 the auto-covariance matrix, $R_x$, can be computed, where, for example, $R_x = x \cdot x^H$.

At block 312 the clutter power, $P_c$, and the noise floor, $\sigma_N$, can be estimated. Typically, these parameters are unknown. However, they can be estimated using various techniques. These parameters can be roughly estimated from the data using any number of techniques known in the art. For example, these parameters can be estimated using the techniques described in U.S. patent application Ser. No. 11/322,524 filed Dec. 20, 2005, entitled "System and Method for Processing Data in Weather Radar," which is incorporated herein by reference in its entirety. In some embodiments, the clutter width $\sigma_c$ can be chosen from predetermined values depending on the antenna bandwidth and/or the scan rate. For example, some radars have a clutter width that is approximately 0.2 m/s at a scan rate of 8 deg/s.

At block 316 the filter matrix, A, can be computed using the clutter power and the noise floor estimated in block 312. In some embodiments, the clutter covariance matrix $R_c$ can be calculated from the clutter power $P_c$ estimated at block 312, and an estimation of the clutter width $\sigma_c$; for example, using $$R_c[k, l] = P_c \exp\left(-\frac{8\pi^2 \sigma_c^2 (k-1)^2 T_s^2}{\lambda^2}\right).$$

Once the filter matrix A has been computed the initial filtered auto-covariance matrix $R_y$ can be computed at block 318 for n=1. At block 322, n can be set to equal one. At block 326 the $n^{th}$ signal spectral moments for precipitation echo ($\overline{P_p}$, $\overline{v}$, and $\sigma_p$) can be estimated from the filtered auto-covariance matrix $R_y$. In some embodiments, a signal sample covariance matrix can be constructed from the signal auto-covariance function at different lags. For example, elements of the main diagonal of the covariance matrix are samples of the auto-covariance at lag 0, elements of the 1st diagonal of the covariance matrix are samples of the auto-covariance at lag 1, . . . etc. Therefore, from the covariance matrix the values of the auto-covariance can be estimated at lag 0, lag 1, etc. For example, Signal power can be estimated form the auto-covariance at lag 0, velocity from the auto-covariance at lag 1, spectrum width from the auto-covariance at lag 1 and 2.

At block 330 the $n^{th}$ auto-covariance precipitation matrix $R_p$ can be computed from the spectral moments using a Gaussian estimation (e.g., using equation (2)). At block 334, the next filtered auto-covariance matrix can be computed (e.g., using $R_{y,n+1} = R_{y,n} + R_{p,n} - AR_{p,n}A^H$). At block 338, the spectral moments can be computed for the $(n+1)^{th}$ filtered auto-covariance matrix.

At block 342 it can be determined whether the power and/or velocity difference between consecutive auto-covariance matrices is converging by determining whether the difference is below some predefined threshold. If the difference is not converging, then n is incremented at block 346 and process 300 returns to block 326. If the difference is converging, then process 300 returns the $n+1^{th}$ filtered auto-covariance matrix at block 350.

Figure 4:
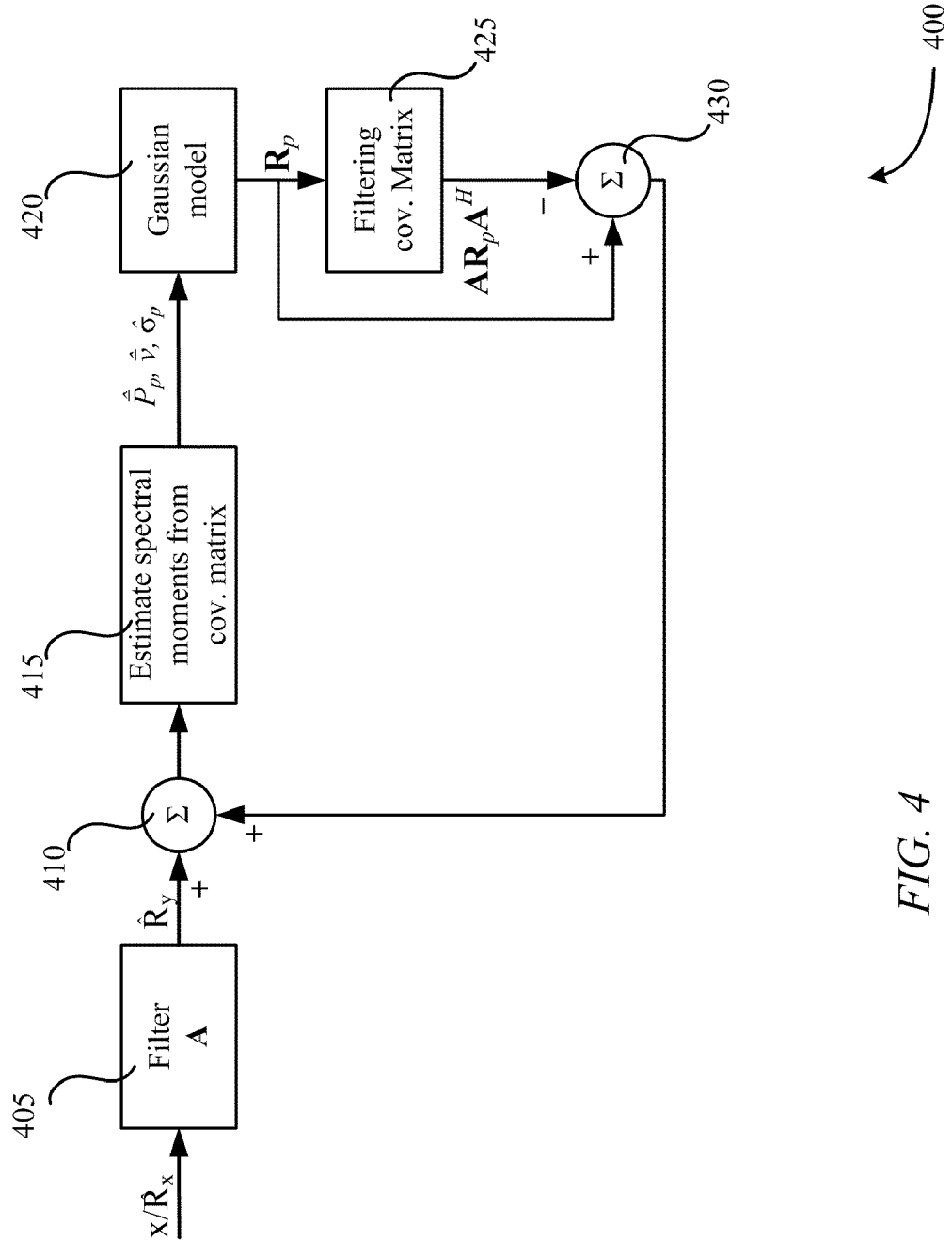
FIG. 4 is another example of a process for enhancing radar data according to other embodiments.

FIG. 4 shows block diagram 400 that can enhance radar data according to other embodiments. Radar data x and corresponding auto-covariance matrix $R_x$ can be filtered at block 405 and filtered auto-covariance matrix $R_y$ can be produced. The filter, A, can be determined or estimated as disclosed throughout this disclosure.

During the first iteration block 410 can be bypassed. During subsequent iterations, the difference between the auto-covariance precipitation matrix $R_p$ and the filtering covariance matrix $A R_p A^H$ can be added to the filtered auto-covariance matrix $R_y$. The spectral moments (e.g., $\bar{P}_p$, $\bar{v}$, and $\sigma_p$) can be estimated at block 415. At block 420 the auto-covariance precipitation matrix $R_p$ can be determined from the spectral moments using a Gaussian (or any other) model at block 420. Finally, the filter can be applied to the auto-covariance precipitation matrix $R_p$ at block 425 and the difference between the auto-covariance precipitation matrix $R_p$ and the filtered auto-covariance precipitation matrix $R_p$ can be computed at 430. Iterations can continue until the power differences between two consecutive iterations is less than a threshold value.

FIGS. 3 and 4 show a flowchart and a block diagram that can be used to filter ground clutter from radar data using a Gaussian model in the time domain (GMAP-TD) according to some embodiments. The following mathematically shows the applicability of these processes. The value x denotes the m×1 complex time series data collected from a radar system, its auto-covariance $R_x$ can be written as:

$$R_x = R_c + R_p + R_N \tag{1}$$

where $R_c$, $R_p$ and $R_N$ are auto-covariance matrix of ground clutter, precipitation, and noise respectively. According to a Gaussian model, the matrix elements can be expressed in term of signal spectral moments:

$$R_c[k, l] = P_c \exp\left(-\frac{8\pi^2 \sigma_c^2 (k-1)^2 T_s^2}{\lambda^2}\right) \tag{2}$$

$$R_p[k, l] = P_p \exp\left(-\frac{8\pi^2 \sigma_p^2 (k-1)^2 T_s^2}{\lambda^2}\right) \exp\left(-j\frac{4\pi \bar{v}(k-1)T_s}{\lambda}\right)$$

$$R_N[k, l] = \sigma_N^2 \delta(k-1)$$

$$k, l = 1, \ldots, m$$

where $T_s$ is the sampling rate, $\lambda$ is wavelength. In these equations $P_c$ is the clutter power, and $\sigma_c$ is clutter width in m/s. The ground clutter center can be assumed to be at zero or near zero Doppler velocity ($\bar{v} \approx 0$), $\sigma_N^2$ is the power of an additive white Gaussian noise.

A time variant filter A (the filter matrix) of dimension m×m can be considered. The auto-covariance matrix of the filter output y=Ax can be written as, $$R_y = E[yy^H] \tag{3}$$
$$= E[(Ax)(Ax)^H]$$
$$= A R_x A^H$$
$$= A(R_c + \sigma_N^2 I_m)A^H + A R_p A^H$$

The first term in the sum is the response of the filter to ground clutter signal and noise. It can be assumed that there is no weather echoes in the received signal ($R_p = 0$) then the output of the filter just contains noise and has the auto-covariance matrix.

$$A(R_c + \sigma_N^2 I_m) A^H = \sigma_N^2 I_m \tag{4}$$

In general, ground clutter filters are high pass filters. In the estimation of the three most important signal spectral moments, i.e. the mean power, mean velocity and spectrum width, estimates can depend on the auto-covariance function of the filtered signal. Because the phase response of the filter is not involved in the transformation of the power spectral density of the signal, it has no effect on the auto-covariance function of the filter output. It is relatively easy to prove that for any choice of matrix A satisfying the filter equation (4) the filter power response is the same. Therefore, we simply opt for a solution for equation (4):

$$A = (R_c / \sigma_N^2 + I_m)^{-1/2} \tag{5}$$

To compute the filter A from (5), $R_c$ and $\sigma_N^2$ should be known or estimated, but clutter parameters and noise power are unknown. However, for filtering purpose these parameters can be roughly estimated from the data. Methods to estimate clutter power and noise floor are fairly simple and are known in the art. For example, A. D. Siggia and R. E. Passarelli, *Proc. of 3rd European Conf. On Radar in Meteorol. and Hydrology (CDROM)*, Visby, Sweden, 2004, which is incorporated herein by reference for all purposes, describes one technique for estimating clutter power and noise floor. These parameters can also be estimated using the techniques described in U.S. patent application Ser. No. 11/322,524 filed Dec. 20, 2005, entitled "System and Method for Processing Data in Weather Radar," which is incorporated herein by reference in its entirety. Any other technique can be used without reservation. The clutter width $\sigma_c$ can be chosen from predetermined values depending on the antenna beamwidth and scan rate. For example, for some radars, clutter width can be approximately 0.2 m/s at scan rate of 8 deg/s.

The estimation of dual-polarization parameters (i.e. the co-polar autocorrelation coefficient $\sigma_{HV}$ and the differential propagation phase $\Phi_{dp}$) requires both H and V channels to be processed exactly the same way to minimize the estimate errors. For a GMAP-TD system (e.g., those described herein), this requirement can be simply done by applying the same filter A to both the H and V channels. In this case, filter A is designed with $P_c = \max(P_c^H, P_c^V)$ and $\sigma_N = \max(\sigma_N^H, \sigma_N^V)$.

In the second term of equation (3) the auto-covariance of the weather signal $R_p$ is also transformed. Since A is a high pass filter, only a part of the weather overlapping clutter can be suppressed. To mitigate this problem, an interpolation procedure can be used to recover the transformed part of the weather echo (e.g., as shown in FIGS. 3 and 4). The remaining weather signal is used as the initial input of the iteration. To re-construct the signal auto-covariance matrix, the Gaussian signal model in (2) is used. In some embodiments, the algorithm can be summarized as followings: 1) estimate clutter power and noise floor; 2) compute the filter matrix A based on equation (5); 3) compute the auto-covariance matrix of the filter output ($R_y = AR_x$); 4) initially estimate signal spectral moments for precipitation echo ($\overline{P}_p, \overline{v}, \sigma_p$); 5) calculate the difference of the auto-covariance functions of the weather signal before and after applying filter A and use that amount to adjust the output covariance function; 6) repeat step 4 and 5 until the power difference between two consequence iterations less than a predetermined threshold; 7) dual-polarization parameters are obtained from filtered time series using standard method. This iteration can be shown to converge after few steps. In some embodiments, the final results can mitigate the effect of ground clutter filtering on the weather signal.

GMAP-TD system performance can be verified with uniformly sampled data. In order to compare GMAP-TD with traditional clutter filters, a spectral filtering method that is similar to GMAP can be implemented. That spectral method is considered to be the state of the art in clutter filtering. Performance of any spectral filtering method is restricted to high CSR (50 dB). We simulated data with CSU-CHILL system specification and SNR=20 dB, CSR=50 dB in H channel. Although performance of spectral filter for dual-polarization parameters has not documented, one can get these parameters from filtered H and V data using the standard estimator. The top graphs in FIGS. 6, 7, 8, 9 and 10 show biases and standard deviations in power (FIG. 6), mean velocity (FIG. 7), co-polar autocorrelation coefficient (FIG. 9), and the differential propagation phase estimates (FIG. 10) for uniform sampling case. It is shown that GMAP-TD system gives smaller standard deviation for all estimates compared to the spectral filter (SF). Bias in power is about 0.5 dB lower. Performance in dual-polarization estimates by GMAP-TD also much better than the results of SF. Especially, at the Doppler interval near zero GMAP-TD is much more superior to the SF in this case.

Figure 5A:
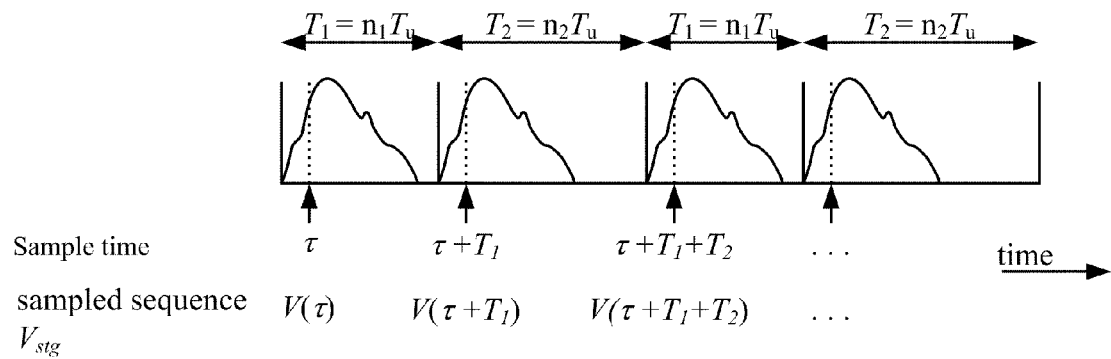
FIG. 5A is a timing diagram for a staggered PRT sampling technique according to some embodiments.

FIG. 5A shows timing diagram 500 for a staggered PRT sampling technique according to some embodiments. A staggered pulse repetition time (PRT) scheme can be used to resolve the rage-velocity ambiguity problem. In some embodiments, a PRT sampling scheme may not be used in conjunction when the data is filtered using a Gaussian model in the frequency domain. Generally, the two pulse spacing $T_1$ and $T_2$ are chosen as multipliers of a certain unit time, T. In some embodiments, the optimal stagger ratio $T_1/T_2$ is 2/3. Various other stagger ratios can also be used.

In some embodiments, elements of the auto-covariance matrix can be replaced by, $$R_{k,l} = R\left(\text{int}\left(\frac{l-k}{2}\right)(T_1 + T_2) + 2\,\text{frac}\left(\frac{l-k}{2}\right)T_1\right) \quad (6)$$

Figure 5B:
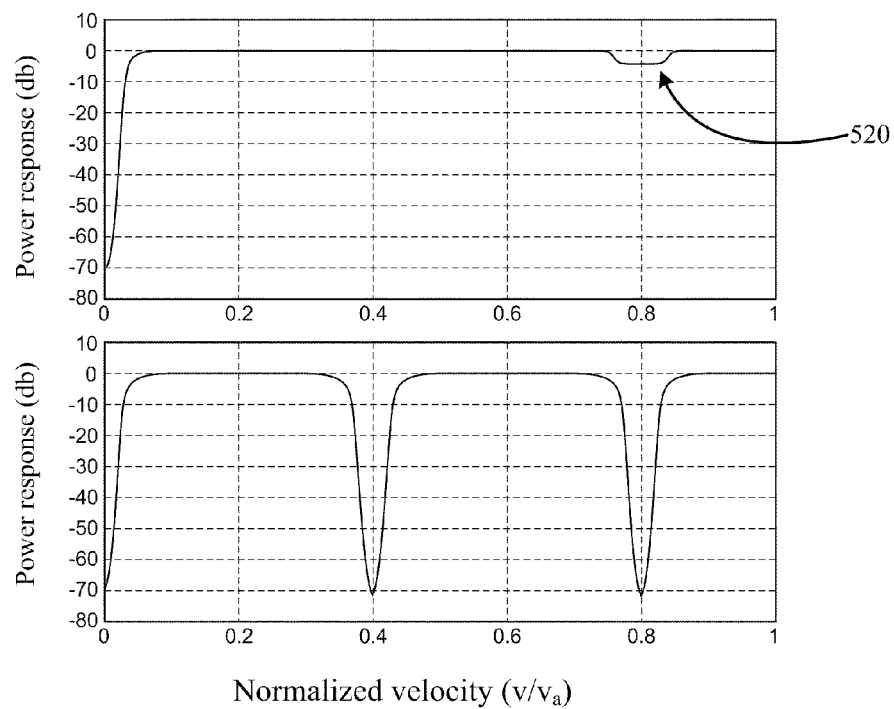
FIG. 5B Frequency response of GMAP-TD filter for staggered PRT 2/3 scheme.
Figure 6:
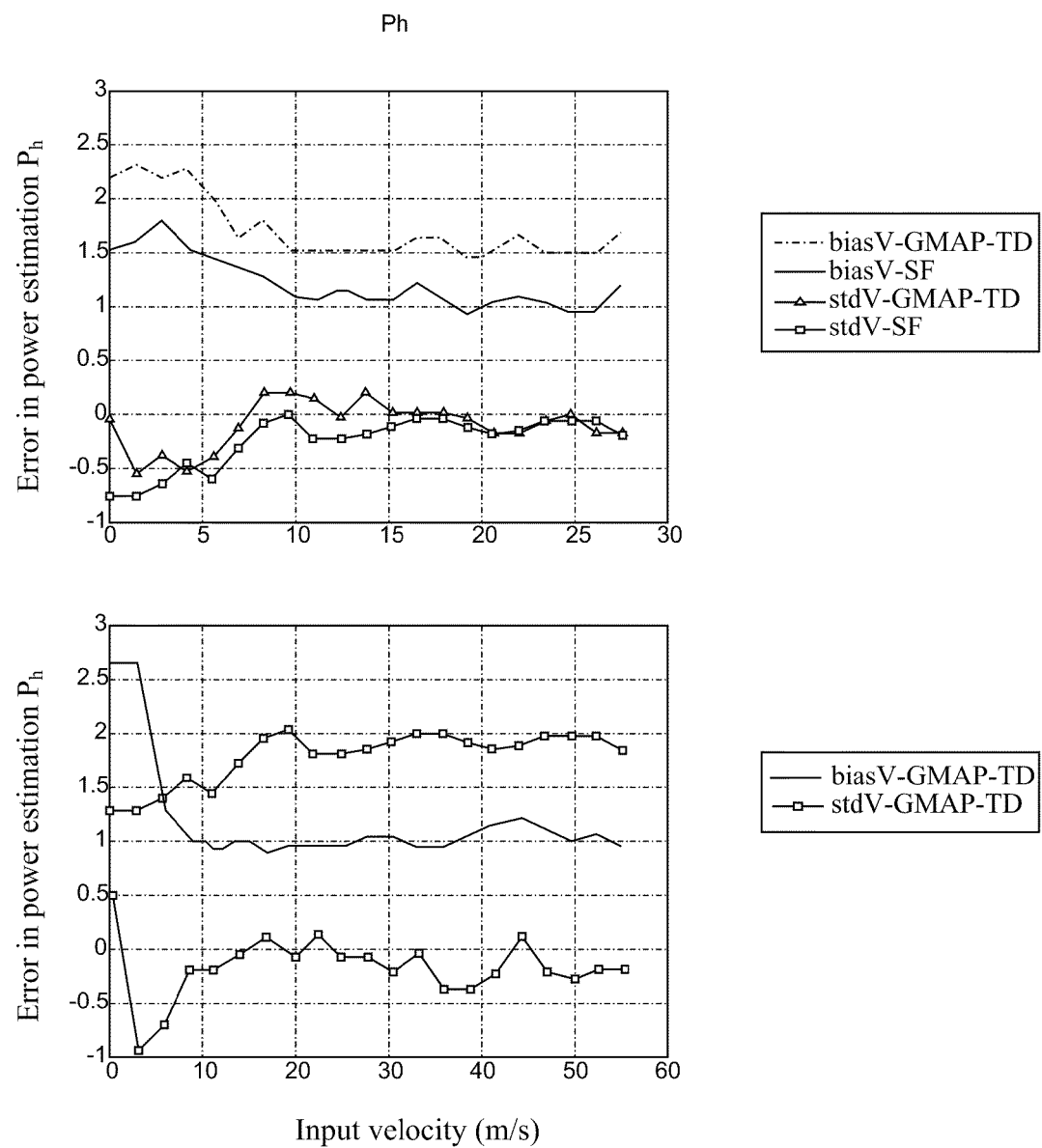
FIGS. 6-10 show the performance response of radar data using various embodiments of the invention.
Figure 7:
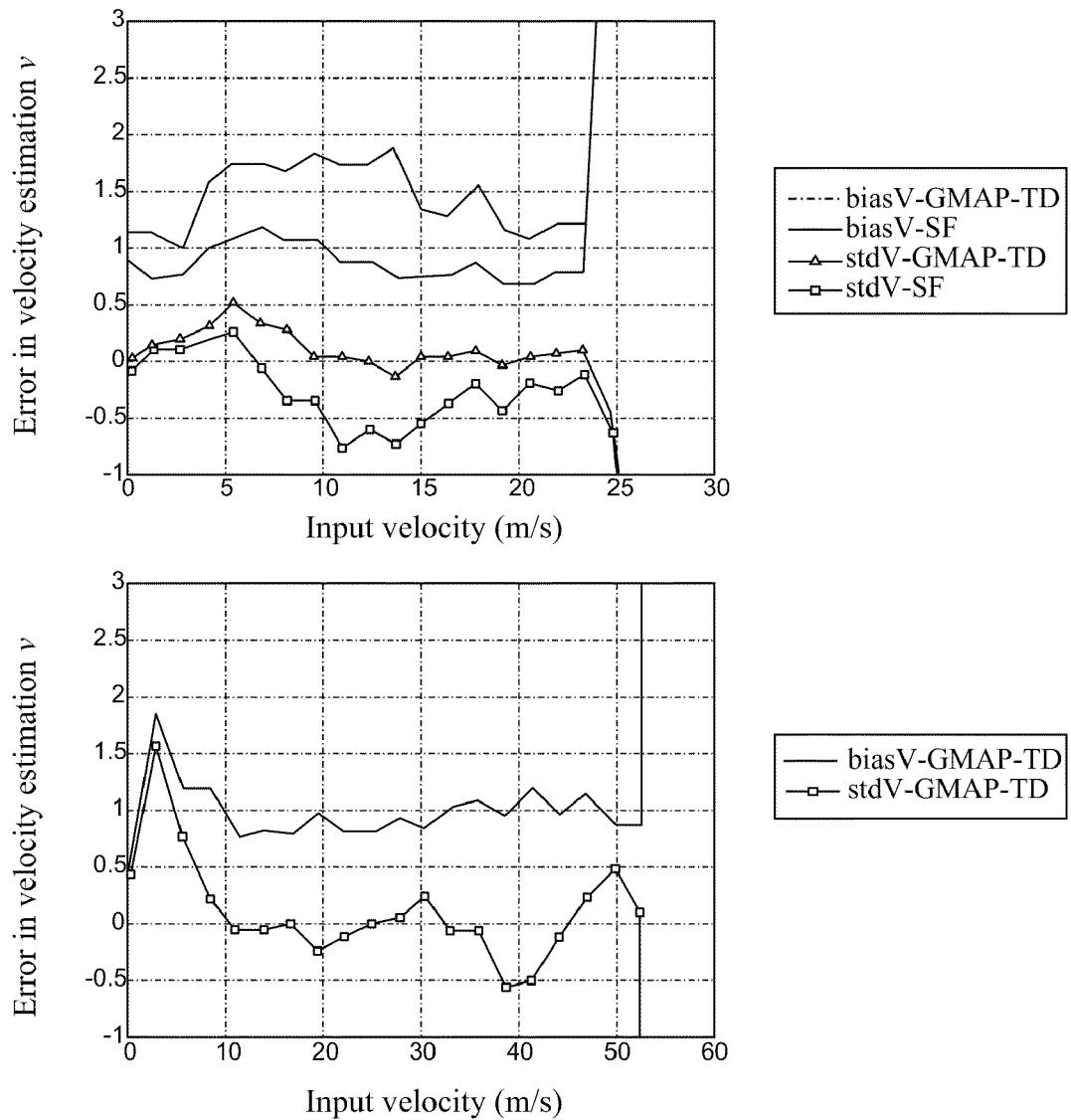
Figure 8:
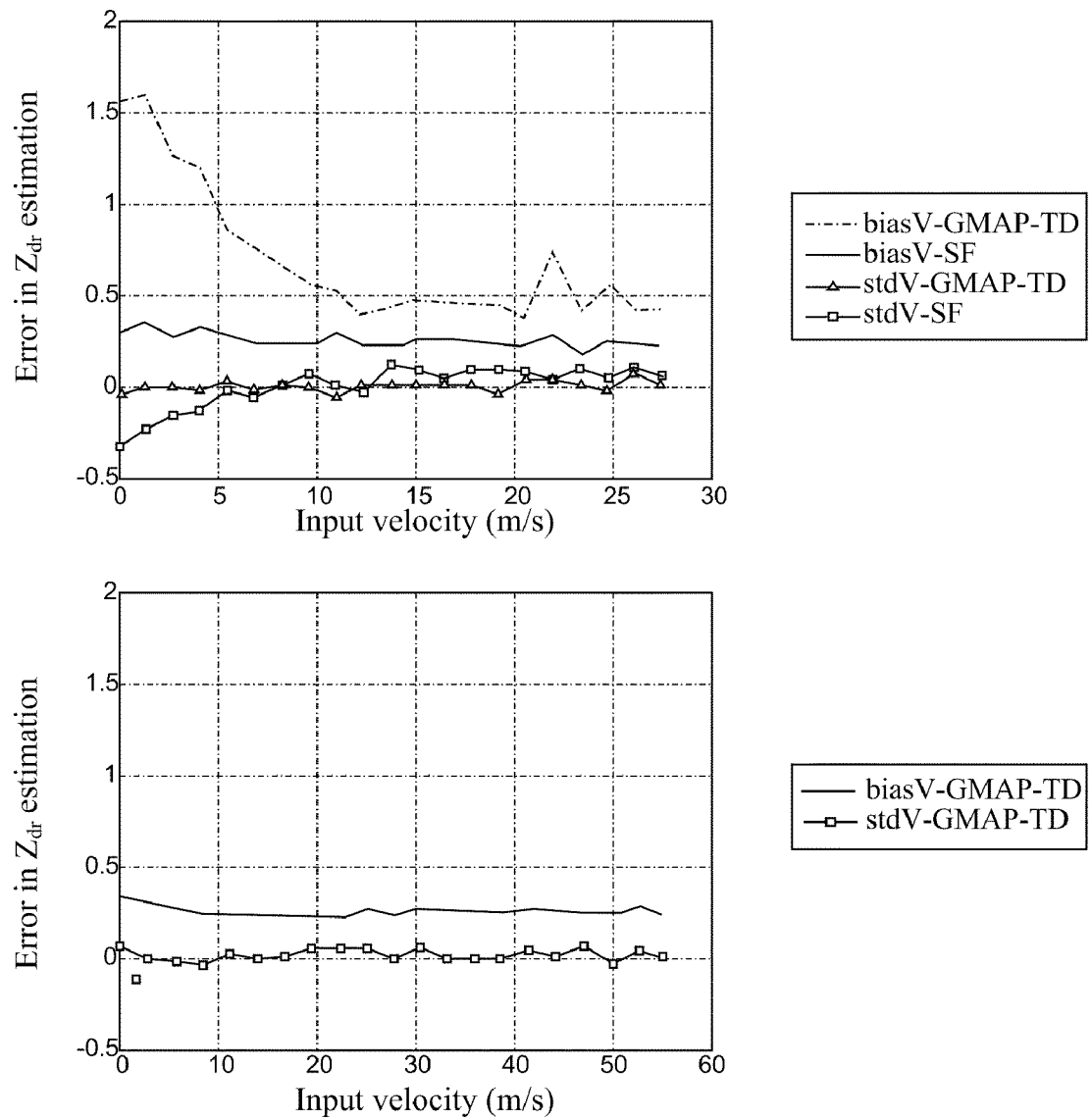
Figure 9:
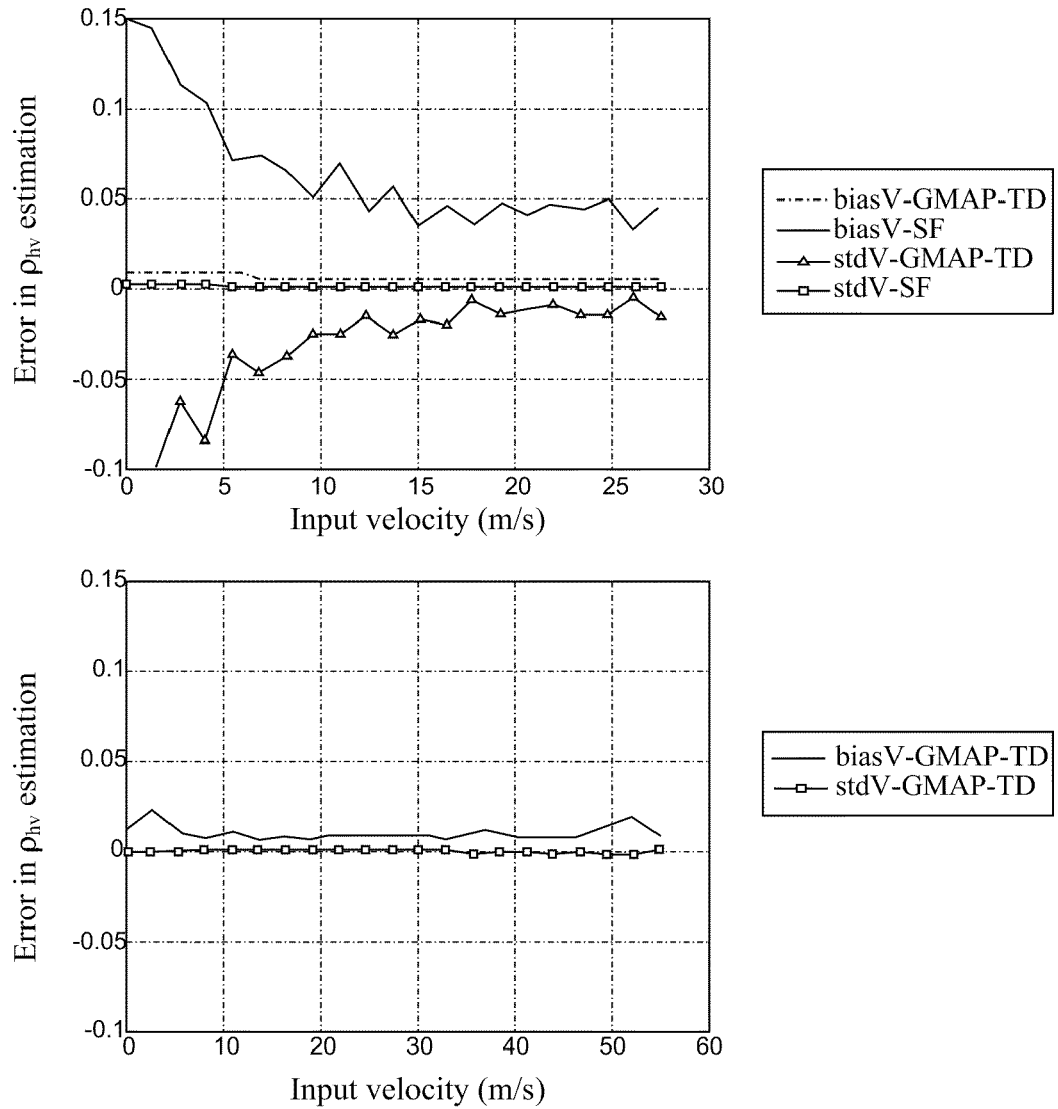
Figure 10:
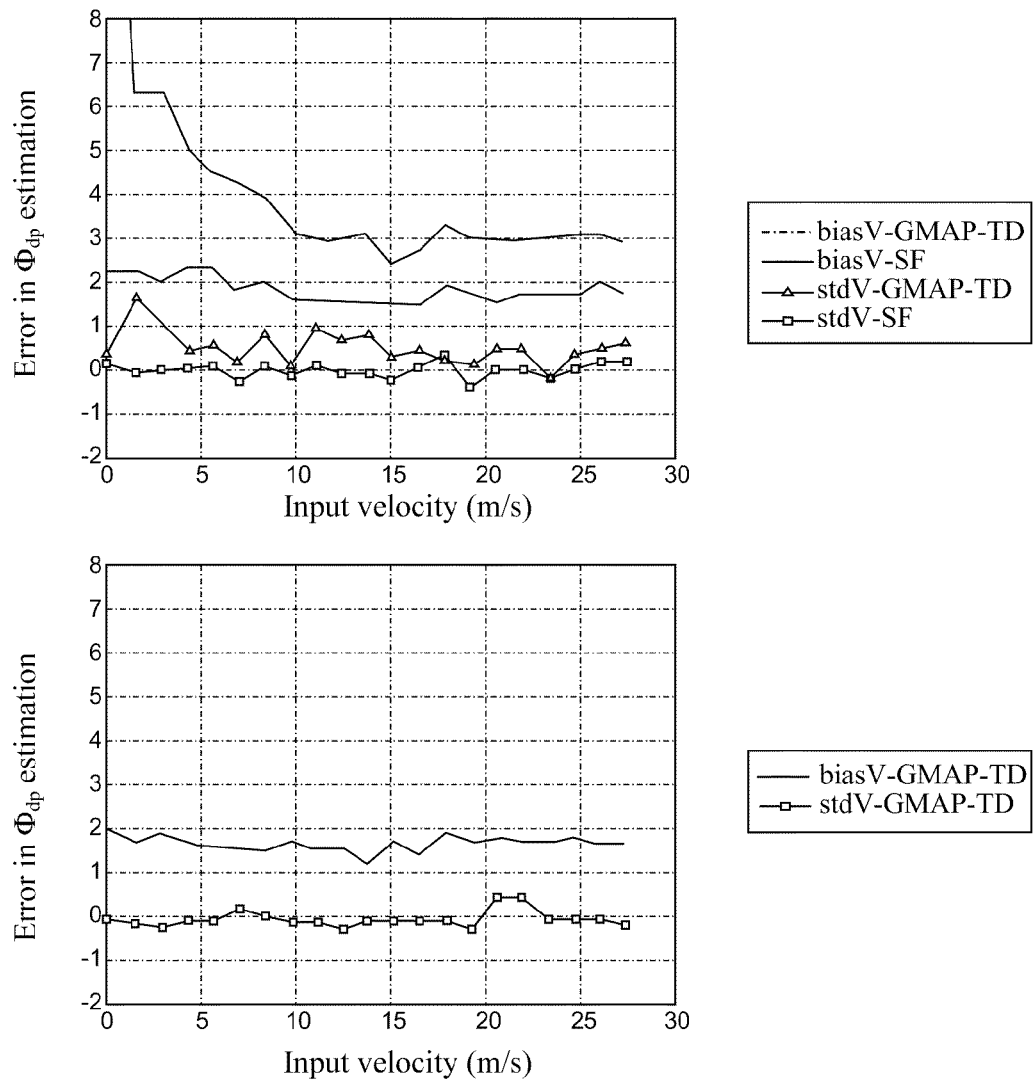

Panel (a) in FIG. 5B shows a magnitude frequency response of GMAP-TD filter for a staggered PRT 2/3 scheme. An unexpected notch 520 at a specific band in the Doppler range is apparent. Notch 520, can be due to the natural properties of non-uniform sampling. Fortunately, the unexpected notch location(s) can be known for a given staggered PRT scheme. If the weather echo is located at this frequency band, estimated mean velocities may be incorrect. For staggered PRT 2/3 the incorrect estimated velocity can differ from the true value by $\pm 0.4v_\alpha$ or $\pm 0.8v_\alpha$ where $v_\alpha$ is the maximum unambiguity velocity. In some embodiments, to correct this problem the filter can be modified to include additional notches at $\pm 0.4v_\alpha$ and $\pm 0.8v_\alpha$ with the same level (panel (b), FIG. 5B). It should be noted that the modified filter is just used to correct the mean velocity at the initial stage of the iteration procedure (FIG. 4).

A simulation of a GMAP-TD system has been performed with staggered PRT 2/3 data with the parameters shown in Table 1. The performance of GMAP-ID system for staggered RPT technique with these parameters is shown in FIGS. 6B, 7B, 8B, 9B and 10B. In some embodiments, the GMAP-TD system shows good results for staggered PRT 2/3. In other embodiments, the performance is not as good as in the uniform sampling case for mean power and velocity estimates, but that is expected. Bias in power is less than 1 dB for the whole Doppler interval. Velocity estimation has less than 3% of outliers (incorrect estimates) at $\overline{v} = \pm 0.8v_\alpha$. In some embodiments, the performance in dual-polarization parameter estimation is as good as that in uniform sampling case.

TABLE 1

Simulation Specifications for Staggered PRT

| Freq GHz | $T_u$ ms | $PRT_1/PRT_2$ | m | SNR dB | CSR dB | $\sigma_c$ m/s | $\sigma_p$ m/s | v, m/s |
|---|---|---|---|---|---|---|---|---|
| 2.7 | 0.5 | 2/3 | 64 | 20 | 50 | .25 | 4 | $[0:.05:1]v_\alpha$ |

The performance of GMAP-TD filter can also be verified using actual radar measurements in both scenarios: uniform sampling and staggered PRT 2/3 with data collected on Dec. 20, 2006. Small different time between the two observations ensures a reasonable comparison on results for the two transmission schemes. The results shown in FIG. 5B indicate that filtering using embodiments described herein (e.g., GMAP-TD) removed ground clutter fairly well for both uniform sampled and staggered PRT 2/3 data sets, especially at ranges less than 20 km and mountain regions where ground clutter is very strong. Difference between original and filtered power shows a clutter suppression ratio up to 50 dB for staggered PRT data from CHILL radar. Besides, the uniform data shows velocity folding at the northeastern region. That means the precipitation mean velocity is over the maximum velocity (27.5 m/s). For staggered PRT setting the maximum velocity can be extended up to 55 ms$^{-1}$. The second panel in the last row of FIG. 5B shows that the velocity folding problem was solved with the staggered PRT technique. GMAP-TD provides correct velocity estimate in this case. In addition, the dual-polarization estimates are very good for the staggered PRT observation except for some regions near the Rocky Mountain where the receiver seems to be saturated by very high returned power. A more detail comparison between GMAP-TD and SF performance, profiles sampled form PPI measurement are shown in FIG. 12-16. In all cases, GMAP-TD gives equal or better results.

Figure 11:
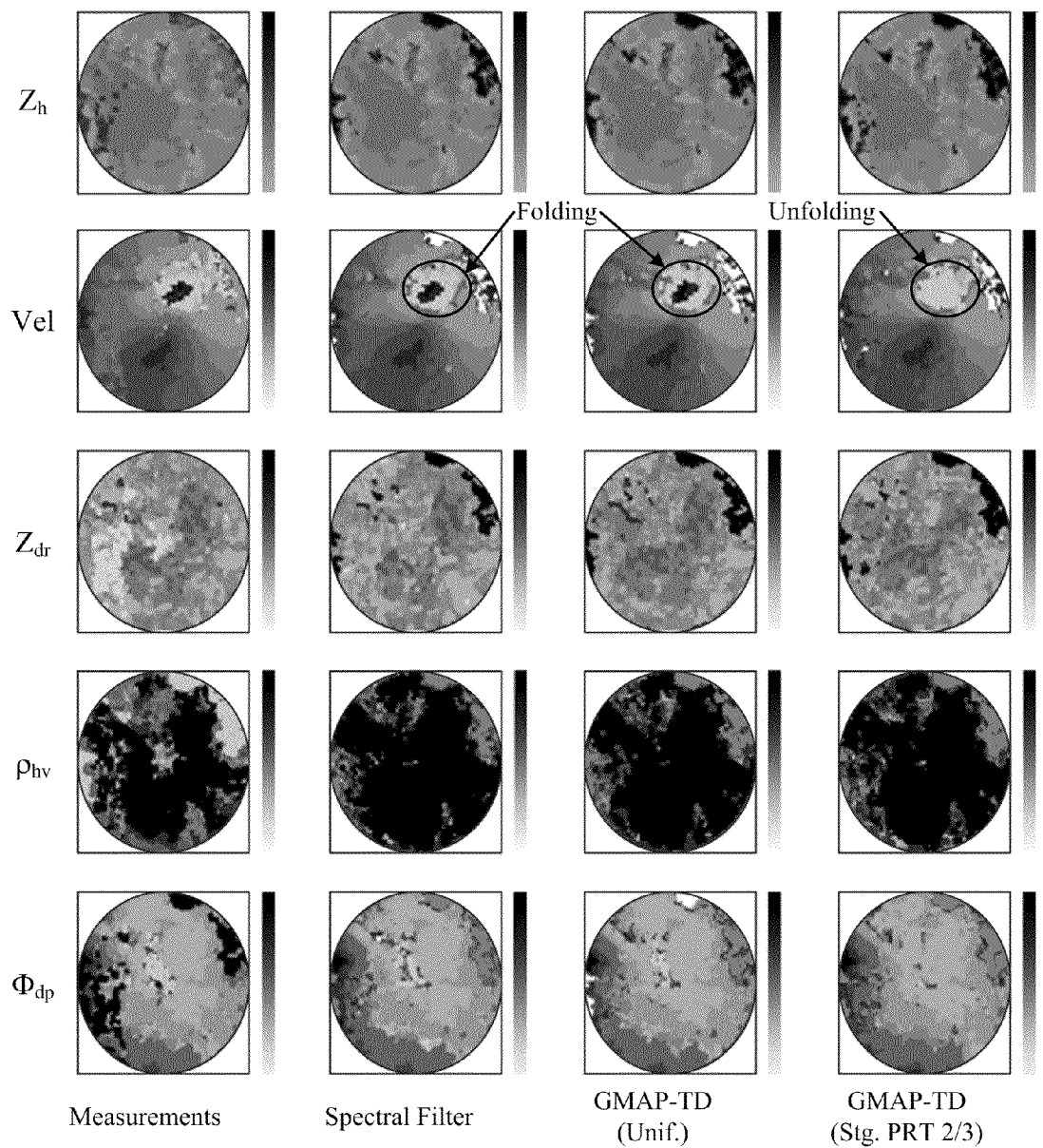
FIG. 11 shows plots comparing the measurements with various filters including those performed with embodiments described herein.
Figure 12:
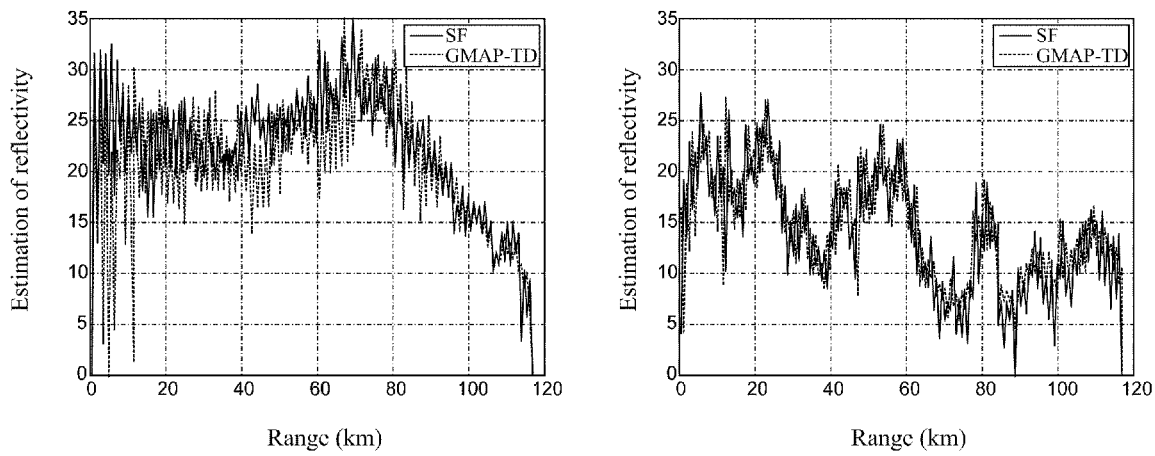
FIG. 12 shows a comparison of reflectivity profiles results using spectral and time domain filtering at two different angles.
Figure 13:
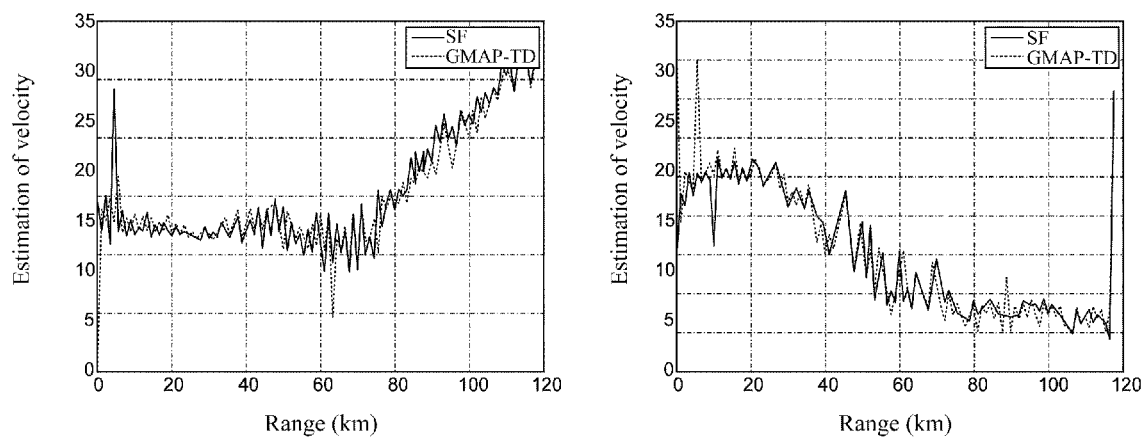
FIG. 13 shows a comparison of velocity profiles results using spectral and time domain filtering at two different angles.
Figure 14:
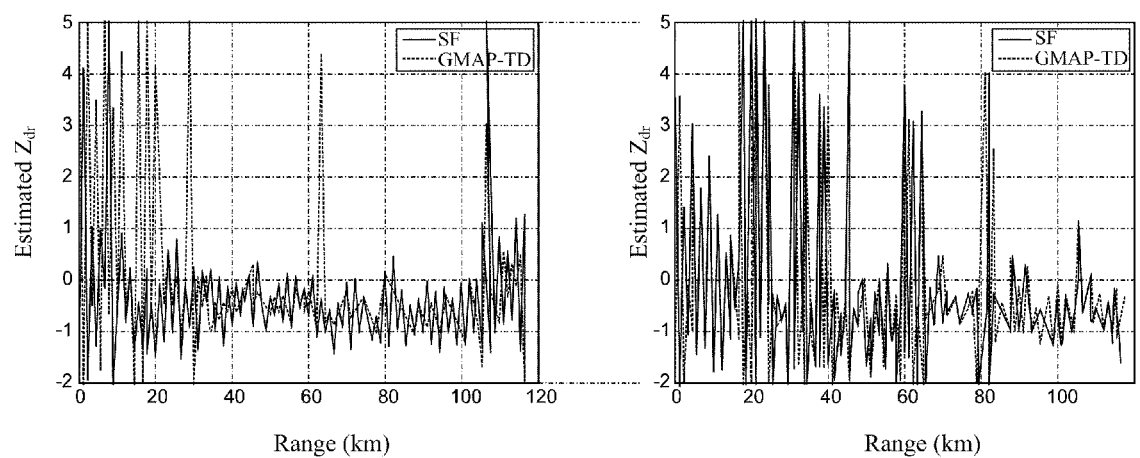
FIG. 14 shows a comparison of differential reflectivity profiles result using spectral and time domain filtering at two different angles.
Figure 15:
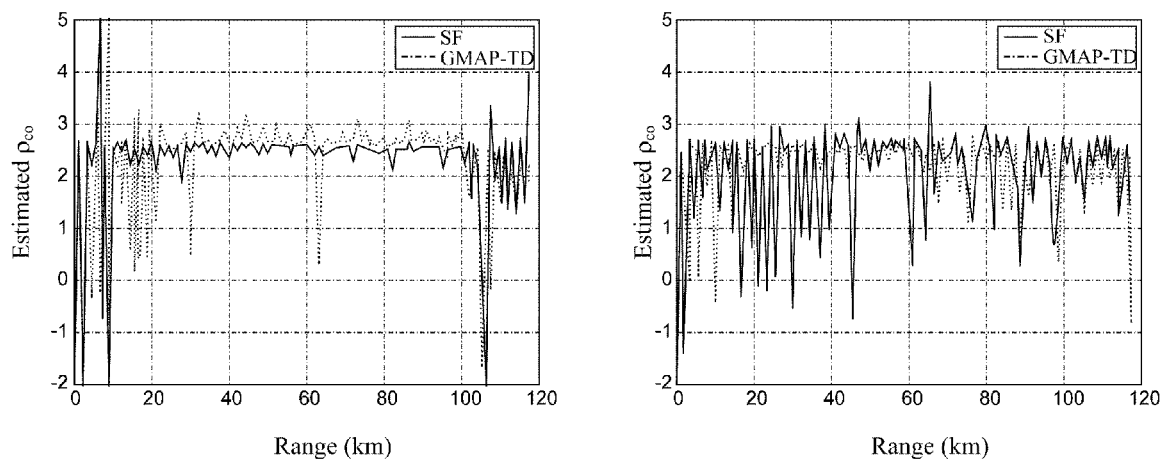
FIG. 15 shows a comparison of co-polar correlation coefficient profile results using spectral and time domain filtering at two different angles.
Figure 16:
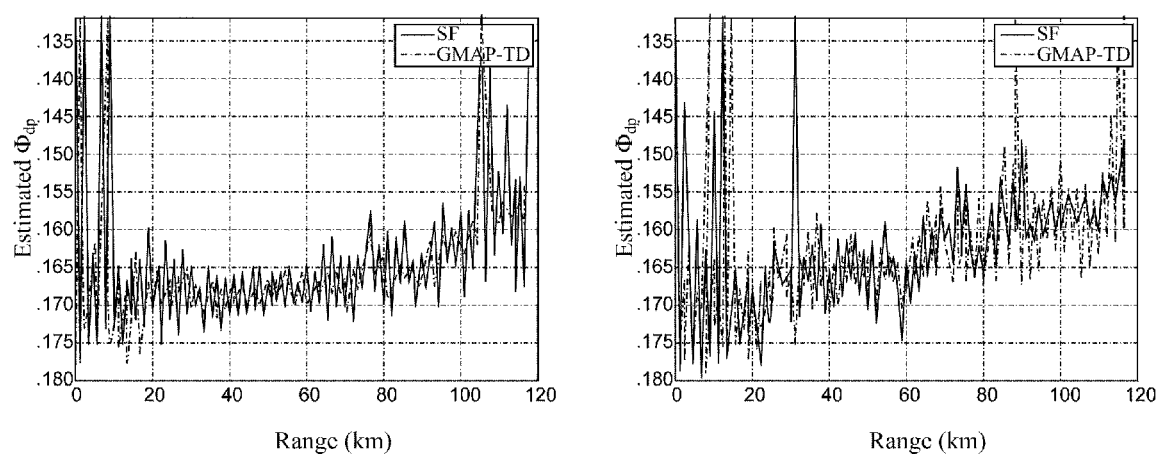
FIG. 16 shows a comparison of differential propagation phase profile results using spectral and time domain filtering at two different angles.

FIG. 11 shows plots indicating various parameters for received data (col. 1), data with the spectral filter applied (col. 2), and data with a GMAP-TD filter applied (col. 3). The last column shows data recorded one minute prior to the data collected in the first three columns. This data is filtered with GMAP-TD using PRT 2/3 schemes as described above.

Circuits, logic modules, processors, and/or other components may be described herein as being "configured" to perform various operations. Those skilled in the art will recognize that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

While some embodiments of the invention are described herein with reference to particular blocks, it is to be understood that the blocks are defined for convenience of description and are not intended to imply a particular physical arrangement of component parts. Further, the blocks need not correspond to physically distinct components.

While the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

What is claimed is:

1. A method comprising:
   propagating a radar signal to a region of interest using a radar transmitter;
   collecting sampled time-domain radar data scattered within the region of interest; and
   mitigating clutter in the radar data using a Gaussian model in the time domain.

2. The method according to claim 1, wherein the mitigating clutter further comprises:
   determining an auto-covariance filter output matrix $R_y$ using an estimated filter matrix A with the radar data;
   calculating spectral parameters from the auto-covariance filter output matrix;
   determining a precipitation covariance matrix $R_p$ using the spectral parameters; and
   iteratively estimating the next auto-covariance filter output matrix using $R_{y,n+1} = R_{y,n} + R_{p,n} - AR_{p,n}A^H$ until the difference between two consecutive spectral parameters is less than a threshold value.

3. The method according to claim 1, wherein the radar data comprises dual polarization radar data.

4. The method according to claim 1, wherein the radar data is collected with a staggered PRT sampling technique.

5. The method according to claim 4, wherein the radar data is collected with a staggered PRT 2/3 sampling technique.

6. The method according to claim 1, wherein the Gaussian model provides the matrix elements for the precipitation auto-covariance matrix as:

$$R_p[k,l] = P_p \exp\left(-\frac{8\pi^2 \sigma_p^2 (k-1)^2 T_s^2}{\lambda^2}\right) \exp\left(-j\frac{4\pi \bar{v}(k-1)T_s}{\lambda}\right),$$

Where $P_p$ is the precipitation signal power, $\sigma_p^2$ is the precipitation spectrum width, $\bar{v}$ is the mean velocity of the precipitation, $T_s$ is the sampling period, and $\lambda$ is the wavelength.

7. The method according to claim 1, wherein the mitigating clutter further comprises estimating a filter matrix A, such that:
   $A = (R_c/\sigma_N^2 + I_m)^{-1/2}$, where $R_c$ is the clutter covariance matrix and $\sigma_N^2$ is the noise power.

8. The method according to claim 7, wherein $R_c$ and $\sigma_N^2$ are estimated.

9. The method according to claim 8 wherein the mitigating clutter further comprises:
   computing the auto-covariance matrix for the filter output using $R_y = AR_x A^H$ where $R_x$ represents the auto-covariance matrix of the input data.

10. The method according to claim 9 wherein the mitigating clutter further comprises estimating signal spectral moments for precipitation echo $(\bar{P}_p, \bar{v}, \sigma_p)$ using $R_y$.

11. The method according to claim 10 wherein the mitigating clutter further comprises estimating a precipitation auto-covariance matrix $R_p$ from the signal spectral moments.

12. The method according to claim 11 wherein the mitigating clutter further comprises:
   calculating the next filter output using $R_{y,n+1} = R_{y,n} + R_{p,n} - AR_{p,n}A^H$; and
   iteratively estimating signal spectral moments from $R_y$ until the power difference between two consequence iterations is less than a predetermined threshold.

13. A radar system comprising:
   a transmitter configured to transmit a radar signal into a region of interest;
   a receiver configured to receive a data signal scattered from the region of interest; and
   a computer system coupled at least with the receiver, wherein the computer system is configured to filter clutter from the data signal using a Gaussian model in the time domain.

14. The radar system according to claim 13, wherein the computer system filter's clutter in real time.

15. The radar system according to claim 13, wherein the receiver samples the data signal with a staggered sampling technique.

16. The radar system according to claim 13, wherein the receiver samples the data signal with a staggered PRT 2/3 sampling technique.

17. The radar system according to claim 13, wherein the computer system filters clutter by applying an filter matrix transformation to the auto-covariance of the signal data.

18. The radar system according to claim 17, wherein the filter matrix comprises $A = (R_c/\sigma_N^2 + I_m)^{-1/2}$, where $R_c$ is an estimated clutter covariance matrix and $\sigma_N^2$ is an estimated noise power.

19. A method for filtering clutter from a radar signal comprising:
   applying, using a computer system, a filter matrix to the auto-covariance matrix of the radar signal producing a first filter output matrix;
   estimating, using a computer system, a precipitation auto-covariance matrix using the first filter output matrix and the filter matrix; and
   calculating, using a computer system, a second filter output matrix wherein the second filter output matrix equals the first filter output matrix plus the difference between the precipitation auto-covariance matrix and a filtered precipitation auto-covariance matrix.

20. The method for filtering clutter from a radar signal according to claim 19 wherein the precipitation auto-covariance matrix is estimated using signal parameters from the first filter output matrix.

21. The method for filtering clutter from a radar signal according to claim 20 wherein the estimating and the calculating are iteratively repeated until the difference between signal parameters of the first and second filter output matrices are less than a threshold value.

* * * * *

UNITED STATES PATENT AND TRADEMARK OFFICE
CERTIFICATE OF CORRECTION

PATENT NO.           : 8,164,512 B2                          Page 1 of 1
APPLICATION NO.      : 12/575698
DATED                : April 24, 2012
INVENTOR(S)          : Chandrasekaran Venkatachalam et al.

It is certified that error appears in the above-identified patent and that said Letters Patent is hereby corrected as shown below:

In the Detailed Description

Column 6, Line 2, please delete " $(\bar{v} \approx 0)$ " and replace with -- $(\bar{v}_c \approx 0)$ --.

Column 6, Line 56, please delete "$\sigma_{HV}$" and replace with --$\rho_{HV}$--.

Column 7, Line 49, please delete "T" and replace with -- $T_u$ --.

Signed and Sealed this
Thirty-first Day of July, 2012

David J. Kappos
*Director of the United States Patent and Trademark Office*